United States Patent
Grubeck et al.

[11] Patent Number: 6,154,657
[45] Date of Patent: Nov. 28, 2000

[54] SMART SUBDIVISION OF BASE STATION CANDIDATES FOR POSITION LOCATION ACCURACY

[75] Inventors: Hans George Grubeck, Solna; Bengt Bengkvist, Järfälla, both of Sweden

[73] Assignee: Telefonaktiebolaget LM Ericsson, Stockholm, Sweden

[21] Appl. No.: 08/967,330

[22] Filed: Oct. 21, 1997

[51] Int. Cl.[7] .................................................. H04Q 7/20
[52] U.S. Cl. ..................... 455/456; 455/456; 455/422; 342/457
[58] Field of Search .................... 455/456, 422, 455/432, 435, 436, 437, 440, 464, 509, 512, 513, 525, 527, 67.1, 457, 423; 342/457, 387, 357

[56] References Cited

U.S. PATENT DOCUMENTS

| | | | |
|---|---|---|---|
| 4,229,620 | 10/1980 | Schaible | 179/2 |
| 4,728,959 | 3/1988 | Maloney et al. | 342/457 |
| 4,731,613 | 3/1988 | Endo et al. | 342/357 |
| 4,740,792 | 4/1988 | Sagey et al. | 342/457 |
| 4,888,593 | 12/1989 | Friedman et al. | 342/387 |
| 4,891,650 | 1/1990 | Sheffer | 342/457 |
| 4,916,455 | 4/1990 | Bent et al. | 342/457 |
| 5,023,900 | 6/1991 | Tayloe et al. | 379/32 |
| 5,058,200 | 10/1991 | Huang et al. | 455/33 |
| 5,095,500 | 3/1992 | Tayloe et al. | 379/32 |
| 5,208,756 | 5/1993 | Song | 364/449 |
| 5,293,642 | 3/1994 | Lo | 455/33.1 |
| 5,317,323 | 5/1994 | Kennedy et al. | 342/457 |
| 5,365,450 | 11/1994 | Schuchman et al. | 342/457 |
| 5,465,289 | 11/1995 | Kennedy, Jr. | 379/59 |
| 5,526,357 | 6/1996 | Jandrell | 340/991 |
| 5,537,460 | 7/1996 | Holliday, Jr. et al. | 379/59 |
| 5,608,410 | 3/1997 | Stilp et al. | 342/387 |
| 5,642,353 | 6/1997 | Roy, III et al. | 370/329 |
| 5,642,398 | 6/1997 | Tiedemann, Jr. et al. | 455/440 |
| 5,914,668 | 6/1999 | Chavez et al. | 455/509 |
| 6,009,334 | 12/1999 | Grubeck et al. | 455/456 |
| 6,011,974 | 1/2000 | Cedervall et al. | 455/456 |

OTHER PUBLICATIONS

Wade H. Foy, "Position–Location Solutions by Taylor–Series Estimation," IEEE Transactions on Aerospace and Electronic Systems, vol. AES–12, No. 2, Mar. 1976, pp. 187–194.

Don J. Torrieri, "Statistical Theory of Passive Location Systems," IEEE Transactions on Aerospace and Electronic Systems, vol. AES–20, No. 2, Mar. 1984, pp. 183–198.

T.S. Rappaport et al., "Position Location Using Wireless Communications on Highways of the Future," IEE Communications Magazine, vol. 34, No. 10, Oct. 1996, pp. 33–41.

European Standard Search Report re RS 100516 US, date of completion of search Jul. 10, 1998.

*Primary Examiner*—Nay Maung
*Assistant Examiner*—Jean Alland Gelin
*Attorney, Agent, or Firm*—Burns, Doane, Swecker & Mathis, L.L.P.

[57] ABSTRACT

In a cellular telephone system of the type having the capability of making measurements useful in determining the location of a mobile station, at least one such measurement is made. The measurement is made in accordance with a cost function which minimizes the costs to the systems. A position fix of the mobile station is determined using the cost function and the measurement.

31 Claims, 4 Drawing Sheets

SMART SUBDIVISION OF BASE STATION CANDIDATES FOR POSITION LOCATION ACCURACY

BACKGROUND

The present invention relates to cellular telephone systems, and more particularly, the invention relates to finding the position of a mobile station in a cellular telephone system.

Positioning in a cellular systems is a feature that is getting, more and more attention. There are a number of applications (Government, Operator and Commercial) that could use information about the current locations of mobile stations in a cellular telephone system.

To measure the location of a mobile station, either an external system, like the satellite based Global Positioning System (GPS), or a system, based on the cellular system itself, a Cellular Positioning System (CPS), can be used. A GPS system is undesirable because it requires extra hardware and cost. A CPS system is often more advantageous because it utilizes the existing hardware found in the cellular telephone system. A CPS positioning system can either be terminal based, where measurements are made in the mobile station or network based, where measurements are made in the network. The present invention is primarily directed to a network based CPS solution.

The position of a mobile station can be determined using measurements which could be time, angular, doppler measurements etc. Time of Arrival (TOA) measurements, measure the propagation time between a mobile station and a base station. Time Difference of Arrival (TDOA) measurements, measure the difference of the propagation time between the mobile station and two different base stations. Angle of Arrival (AOA) measurements, measure the angle to the mobile station relative to a certain direction from the base station. The measurements received from the base stations are then used to calculate the actual position of the mobile station. This procedure using well known geometric equations is called triangulation.

To find the actual position of a mobile, the measurements have to be mathematically converted into a position fix using a technique such as triangulation. The accuracy of the position fix is dependent on a number of parameters. An important parameter that will affect the accuracy of the position fix is the measurement accuracy. A good measurement accuracy yields a good accuracy of the position fix, and vice versa. Another is the measurement geometry, i.e., the relative position of the mobile station and the base stations involved in the positioning procedure. For a bad measurement geometry the accuracy of the position fix can be severely degraded. For example, if all three base stations BS1–BS3 of FIG. 1 from which measurements are made are located to either the left or right of the mobile station MS, then the accuracy can be degraded.

The relationship between the accuracy in the measurements (TOA, AOA, TDOA etc.) and the accuracy in the position fix is dependent on the locations of the base stations and the mobile station. The accuracy can be very poor for some configurations. This phenomenon is called Geometrical Dilution of Precision (GDOP). The GDOP is mathematically defined as the accuracy of the position fix divided by the accuracy of the measurements. If one is limited to measure from a subset or in a sequential order of base station candidates for some reason, GDOP and poor measurement accuracy can severely reduce the accuracy of the position fix with a bad choice of base stations. Moreover, if base stations other than those having the best signal to noise ratios (SNR) are used to make measurements, then the accuracy could also be similarly degraded.

Accordingly, there is a need for an improved positioning system which can overcome these problems.

SUMMARY OF THE INVENTION

The present invention relates to a method and apparatus for determining the position of a mobile station in a cellular telephone system. Measurements are made using the best prior knowledge of the mobile station, and the measurements may be made in a sequential order from a subset of base stations where re-subdivision is feasible. A mathematical function is used to determine the most appropriate subsets of base stations in order to minimize the cost in the system. A certain position fix accuracy is then obtained within a certain time based upon the measurements and the function. If one is limited to measure from a subset of base station candidates or if one is limited to measure from a subset and where re-subdivision is feasible in a sequential order, it is important to take both the GDOP, the measurement accuracy and prior knowledge of the mobile station position into account when determining the subset in order to maximize the accuracy of the position fix.

DETAILED DESCRIPTION OF THE PREFERRED EMBODIMENT

The present invention is particulary well suited for use with a proposed Ericsson positioning method for a GSM cellular telephone system which is called ERA-TA, where the time of arrival (TOA) is measured from at least three base stations in order to determine the distance between the mobile station and each of the base stations. These measurements are transformed into a position fix, and measurements can be performed both during an ongoing call and when the mobile station is in the idle mode. In addition to a TOA measuring procedure such as ERA-TA, the present invention is also particularly well adapted for use with angle of arrival (AOA) and time difference of arrival (TDOA) measuring procedures, as well as any other suitable TOA measuring procedures or any combination of measuring procedures.

Figure 1:
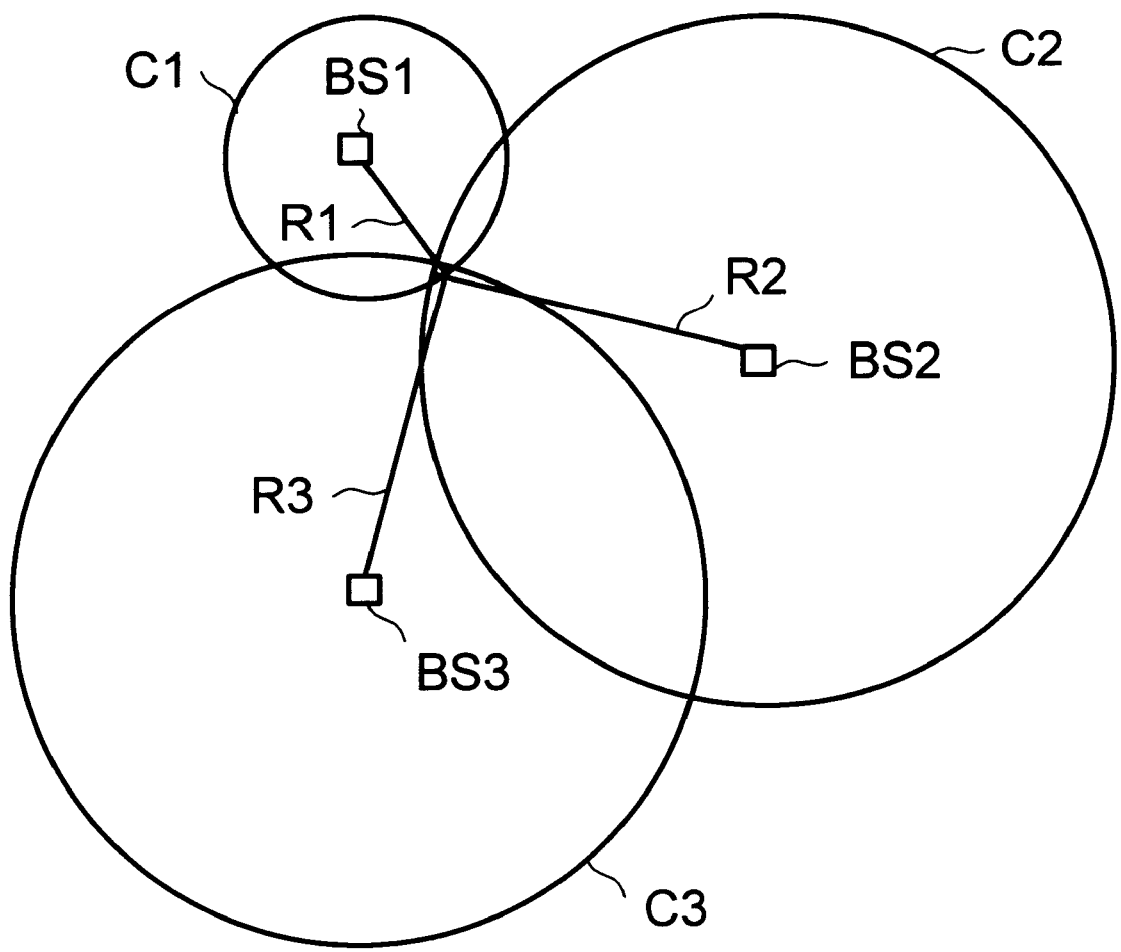
FIG. 1 is a diagram useful in explaining time of arrival (TOA) position measuring technique.

Referring now to FIG. 1, the TOA measuring procedure associated Ericsson's ERA-TA method is depicted. The measuring procedure requires that the mobile station MS be connected to at least three base stations BS1, BS2, BS3. This is done sequentially and requires handovers to at least two base stations. The base stations BS1–BS3 may be chosen on the basis having the best signal to noise ratio (SNR). Another technique for choosing handover candidates is to choose the base station with the best signal to noise ratio (SNR) out of the base stations with the strongest measured downlink power.

In order to determine the position of the mobile station MS the distance of the mobile station MS from each of the three base stations BS1–BS3 is measured using the time of arrival technique. The measured distance R1 from base station BS1 defines a circle C1 around the base station BS1, and the mobile station MS is located somewhere along the circle C1. Likewise, distances R2 and R3 are measured from base stations BS2 and BS3, respectively, thereby defining the circles C2 and C3. The intersection of circles C1, C2 and C3 define the location of the mobile station MS.

The inaccuracies in the measurements of the distances R1, R2 and R3 will influence the accuracy of the position fix. The extent of the influence is determined by the measurement geometry. This can be seen by the crossing of the intersection circles C1, C2 and C3. If the circles C1, C2 and C3 intersect at small angles, there will be a substantial influence in the measurement accuracy, and there will be poor accuracy in the position fix. If the circles C1, C2 and C3 intersect at right angles, there will be less influence of the measurement accuracy, and there will be better accuracy in the position fix. The best accuracy of the position fix is achieved in the center of formation of the base stations BS1, BS2, and BS3. There is also good accuracy on a circle crossing all the base stations BS1, BS2 and BS3. The accuracy is relatively poor close to the base stations BS1, BS2 and BS3.

In addition to the inaccuracies caused by measuring distances in the ERA-TA method, the handovers associated with the ERA-TA method will interfere with the speech transmission. The handover cuts the connection for about 0.5–1.0 seconds. Hence, it is also time-consuming. Therefore, in accordance with the present invention, there is also a need for a smart subdivision and a smart priority order of the handover candidates.

Figure 2:
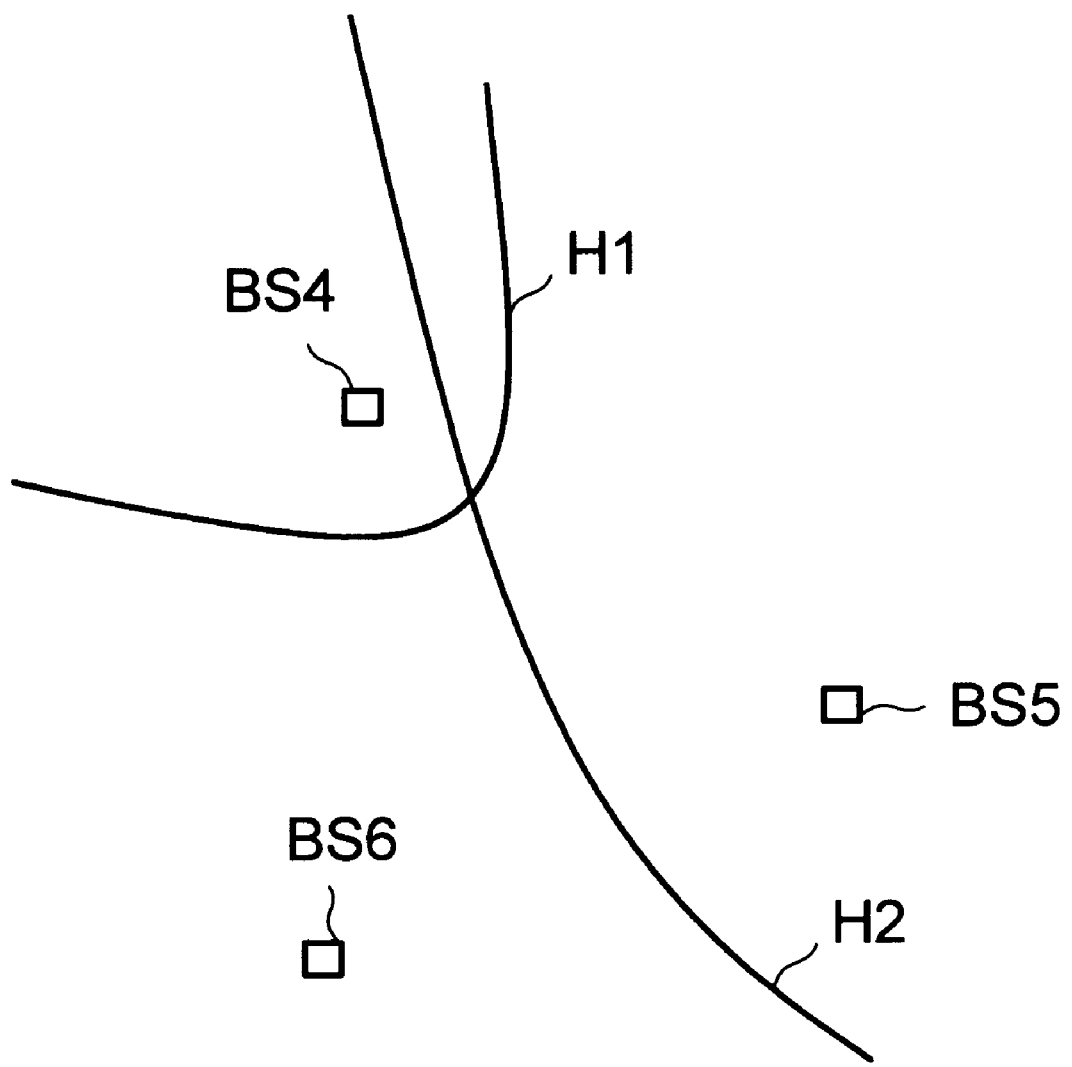
FIG. 2 is a diagram useful in explaining the time difference of arrival (TDOA) position measuring technique.

Referring now to FIG. 2, an example of a time difference of arrival (TDOA) measuring technique is depicted. The number of cells or base stations BS4, BS5, and BS6 are depicted. A TDOA measurement for two base stations BS4, BS5 gives the range differences between the mobile station which could be located anywhere on the hyperbola H1 located between the two base stations. A third measurement from base station BS6 would ordinarily be necessary to determine the location of the mobile station. In accordance with the teachings of the present invention, however, only two TDOA measurements could be used.

In the TDOA measuring technique, the inaccuracies in the measurements will influence the accuracy of the position fix. The extent of the influence is determined by the measurement geometry. This can be seen by the crossing of the intersecting hyperbolas H1, H2. If the hyperbolas intersect at small angles, there will be significant influence of the measurement accuracy and there will be poor accuracy in the position fix. If the hyperbolas intersect at right angles, there will be significantly less influence of the measurement accuracy, and there will be better accuracy in the position fix.

Figure 3:
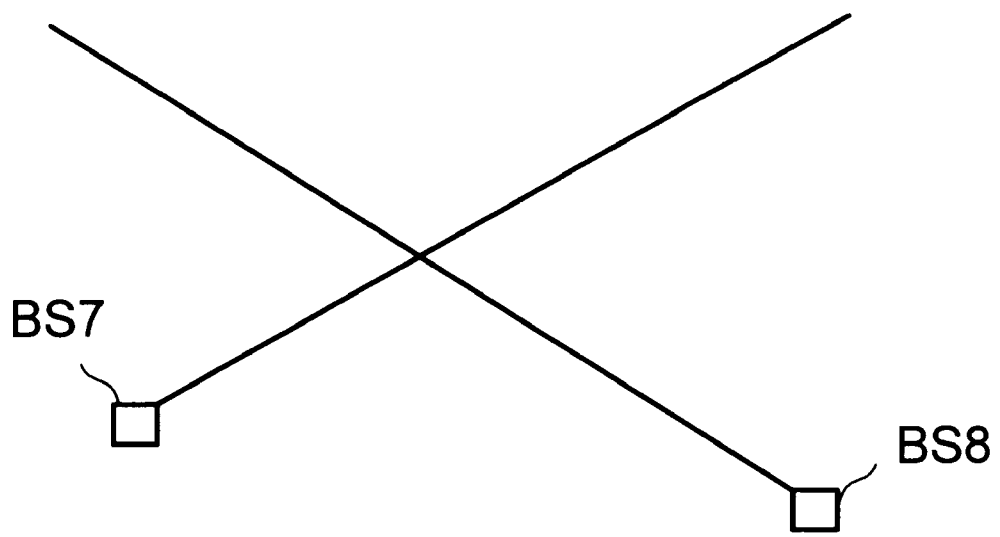
FIG. 3 is a diagram useful in explaining the angle of arrival (AOA) position measuring technique.

Referring now to FIG. 3, an example of an angle of arrival (AOA) measuring technique is depicted. Two base stations BS7 and BS8 are depicted. An AOA measurement for each base station BS7, BS8 provides a bearing to the mobile station from each of the particular base stations. If only one bearing measurement is made, the mobile station could be located anywhere along the bearing. Only two measurements from two different base stations are required in order to determine the location of the mobile station. In FIG. 3, the intersection of the two bearings indicates the location of the mobile station.

In the AOA method, the inaccuracies in the measurements will influence the accuracy of the position fix. The extent of the influence is determined by the measurement geometry. This can be seen by the crossing of the intersecting rays or bearings from base stations BS7, BS8. If the rays intersect at small angles, there will be significant influence of the measurement accuracy and there will be poor accuracy in the position fix. If the bearings intersect at right angles, there will be significantly less influence of the measurement accuracy, and there will be better accuracy in the position fix.

If one wants to determine the position of a mobile station, using either the TOA, TDOA or AOA methods, with a required accuracy and within a required time period, the requirements of such a determination, therefore, are accuracy and time. One can then define a cost-function, which determines the "cost" of performing, measurements in certain ways. This function can include the cost depending on the number of base stations used for measurements, the cost of using high quality channels, the cost due to a certain load distribution in the network, etc. Inputs to this function can be the cell plan, the load distribution in the network, the measuring methods used, prior knowledge of the MS location, expected measurement accuracy on different channels, the number of base stations, etc. The objective of the present invention, therefore, is to minimize the cost while fulfilling the requirements of the position estimate, using the TOA, TDOA, AOA or other suitable measuring method.

The present invention is generally directed to a method for determining the position of a mobile station in a cellular telephone system. A function is defined, which describes the cost involved in choosing a certain subset of base stations and a certain channel for measurements. A subset of base stations and channel are selected, which minimizes the cost according to the defined function. The mobile station is then assigned to the channel. Measurements are made, relating to the position of the mobile station from the selected set of base stations on the channel. A position fix estimate based upon the measurements can then be obtained.

The function can be dependent on one or more different variables. For example, these variables could include:

1. The time when measurements are performed.

2. The time period within which measurements are performed.

3. The predictions of the accuracy of the position fix estimate.

4. Which channels are used for the measurements.

5. Predictions of the accuracy of the measurements on different channels, and these predictions of measurement accuracies may be dependent on the signal quality.

6. The number of base stations in the subset.

7. Prior knowledge of the mobile station position.

8. An estimate of the accuracy of the mobile position.

9. The load distribution in the network for a certain choice of the channel and the subset of base stations.

10. The measurement methods used for the channel and the subset of base stations.

11. The cost of using a high quality channel.

12. The locations of the base stations.

13. The estimated geometric dilution of precision.

The present invention can also be implemented using a number of different measurement methods. These measurement methods can include the time of arrival measurement method, the time difference of arrival measurement method, or the angle of arrival measurement method. The invention is not limited to these particular methods. Any suitable measuring method can be employed.

The present invention can also be implemented by having one base station at a time perform measurements in the subset of base stations, and measurements can be performed in a sequential order. A new subset of base stations and a new channel according to the function can also be selected for every step in the sequential order.

The present invention can also be implemented by having the mobile station assigned to the new channel. The function described above can also be dependent on previous measurements in the sequential order. The function can further be made dependent on the cost due to a change of channel assignment, or the function can be dependent on the cost due to a change of subset of the base station.

Referring now to the drawings and the accompanying text, a description of a specific embodiment of the present invention is provided. In this embodiment the invention is implemented using the TOA or ERA-TA method of FIG. 1. The present invention, however, can also be implemented using methods other than the ERA-TA method. For example, the present invention can be implemented using the TDOA method of FIG. 2 described above, the AOA method of FIG. 3 described above, as well as any other suitable TOA measuring procedures or any combination of measuring procedures.

Figure 4:
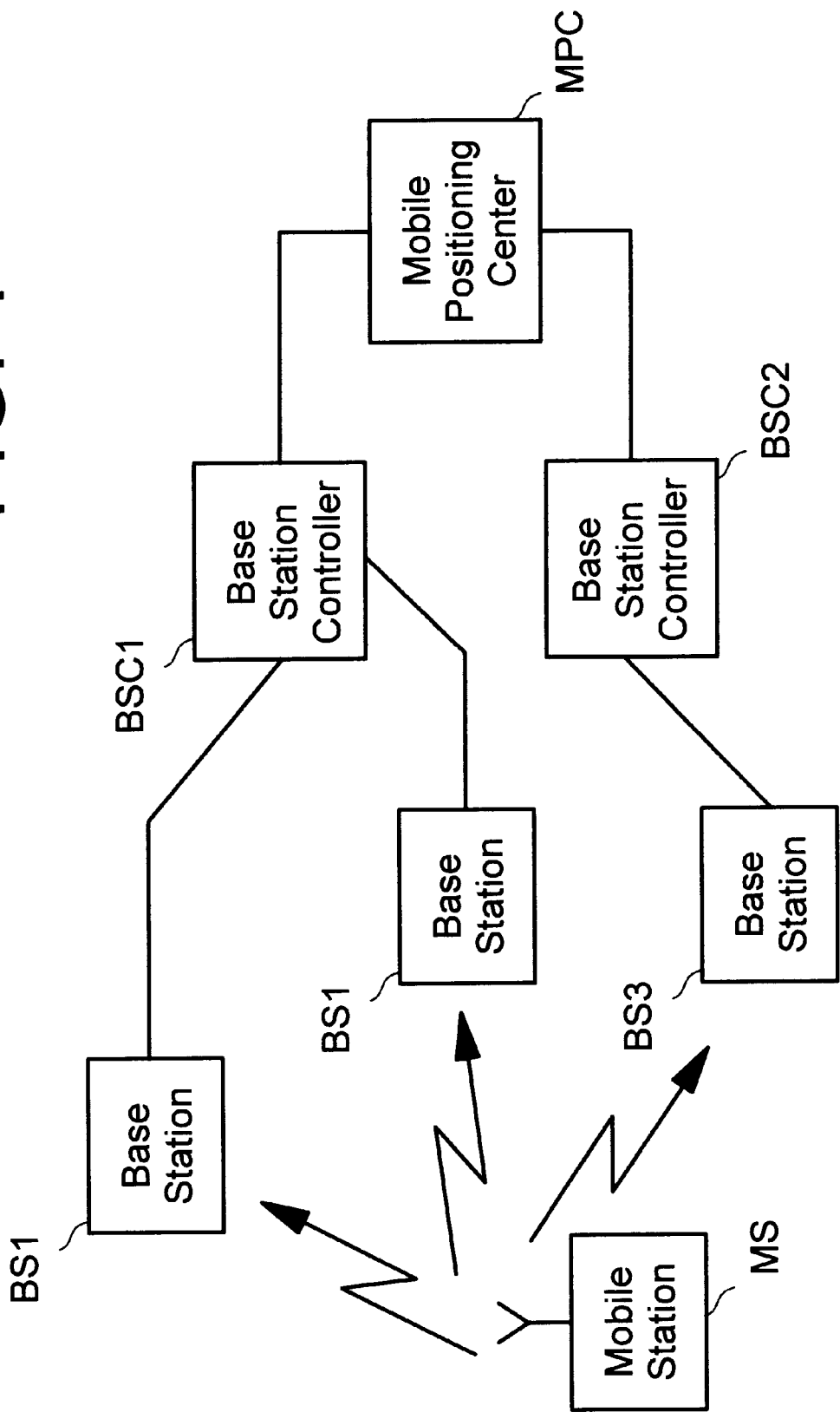
FIG. 4 is a block diagram of a cellular telephone system that utilizes the present invention.

Referring now to FIG. 4, there is block diagram of the cellular telephone system of the present invention. In such a system there are a plurality of mobile stations, but for the purposes of simplicity a single mobile station MS is illustrated in FIG. 4. The mobile station MS is capable of communicating with a plurality of base stations BS1, BS2 or BS3. The base stations BS1–BS3 are connected to base station controllers BSC1 and BSC2. The base station controllers BSC1 and BSC2 are in turn connected to a mobile positioning center MPC.

The operation of the positioning system employed in the cellular telephone system of FIG. 4 will now be explained. Assume, for example, that we have an ongoing call with a serving cell having base station BS1. TOA measurements are already made at the base station BS1 of the serving cell. The TOA measurements can be delivered from the base station BS1 of the serving cell to the base station controller BSC1 over an interface.

The mobile positioning center MPC, which serves as a positioning control unit, can be connected to the base station controllers BSC1 and BSC2, and the mobile positioning center MSC receives the TOA measurement as illustrated in FIG. 4. Handover candidates (HC) are also reported from the base station controllers BSC1 and BSC2 to the mobile positioning center MPC. Another alternative solution is to have the mobile positioning MPC connected to a mobile services switching center MSC. The mobile positioning center MPC preferably includes a suitably programmed digital computer which can process the information reported to it by the base station controllers BSC1 or BSC2.

The signal strength and channel quality of the handover candidates HC are also inputs to the mobile positioning center MPC. The TOA measurement accuracy on a respective channel for every HC, could thereby be estimated. The locations of the handover candidates HC are known to the mobile positioning center MPC. Actually, all the locations of the base stations BS are known to mobile positioning center MPC.

The mobile positioning center MPC now chooses a first faked handover candidate (FHC), i.e. a handover candidate HC with a channel, using a cost-function. The word "faked handover" means the mobile station MS is only connected to the handover candidate, when measurements are performed. The mobile station MS then returns to the base station. With very little knowledge of the mobile station MS location the choice could be a cell and channel with a certain minimum SNR. The faked handover candidate FHC makes TOA measurements and delivers them to the mobile positioning center MPC.

The position of mobile station MS can now be determined down to two points such as the two intersections of circles C1 and C2 in FIG. 1. In some cases, the position of the mobile MS could be determined using a single point, depending on the results of the measurement. The cost-functions are updated, including the new knowledge of the location of the mobile station MS. A new faked handover candidate FHC is determined and the FHC makes TOA measurements and delivers them to the mobile positioning center MPC.

From then on the location of the mobile station MS is determined down to a single point. The cost-function is updated with that and other information and new faked handover candidates FHC are chosen as long as determined by the cost-function. The final estimate is saved and/or delivered to a user application.

If there is prior knowledge of the mobile station MS position, and if the expected measurement accuracy for the handover candidates HC is known, the expected accuracy of the position fix can be determined as follows. The mathematical relationships between the measured MS-HC relationship, and the true measured value are defined. The measured MS-HC relationships could be derived as a first-order Taylor-series with respect to the position of the mobile station MS. The Taylor-series could then be assumed equal to the real measured values, which gives an equation system. Subtracting the estimated true measured value, given by the prior knowledge of the MS position, on both sides of the equation system, leaves only a linear relationship between the errors of the position fix and the errors of the real measured values. A least-sum-squared error solution with the terms in the sum weighted according to the covariances of the measurement errors yields an estimate of the error that would have been achieved, if the position fix were calculated according to a least-sum-squared error search solution by Taylor-series estimation. The covariance matrix of the position fix error is determined. Assuming that the error of the position fix is zero mean Gaussian distributed, the circular error probability (CEP) can be determined for a certain radius. The radius and the probability could be used to represent the accuracy of the position fix. In the case where two estimated mobile station MS locations were input to a the cost-function, the mean CEP of these could be used to compare different FHCS.

The actual algorithms, which could be used to implement the present invention in either a TOA, TDOA, AOA or any combination of measuring procedures, are set forth below. These algorithms are merely an example of how the present invention can be implemented when there is prior knowledge of the mobile position with respect to a certain point, and the present invention is not limited to these specific algorithms.

In this example, the algorithms are restricted to two dimension position location in a plane. Adopt a rectangular set of coordinate axes in the plane, and on these axes let
x,y=true position of the vehicle
$x_k$, $y_2$,=true (known) position of the k th BS, k–1,2, ..., n
n=number of BSs Let $m_i$ be the i th measurement (range, angle of bearing etc.)
And we have an algebraic relation of the form $$f_i(x,y,x_k,y_k)=u_i=m_i-e_i, i=1, 2, \ldots, M$$

where
$u_i$=correct value of the measured quantity
$e_i$=error in the $m_i$ measurement
M=total number of measurements from all Bss.
We assume that the errors $e_i$ are Gaussian distributed with zero-mean values $E[e_i]$=0. We write $r_{ij}=E[e_ie_j]$ for the i–j th term in the error covariance matrix R. Hence, the measured values $m_i$ are Gaussian distributed with $$p(\bar{m}|\bar{r}) = \frac{1}{(2\pi)^{(M-1)/2}|R|^{1/2}} \cdot \exp\left\{-\frac{1}{2}(\bar{m}-\bar{f})^T R^{-1}(\bar{m}-\bar{f})\right\}$$

where $\bar{m}=[m_1 \ldots m_M]^T, \bar{f}=[f_1 \ldots f_M]$ and $\bar{r}=[x\ y]^T$.

The Cramer-Rao gives a lower bound $Q_o$ of the covariance matrix of an unbiased position estimate. The CRLB is given by $$Q_o = \left\{E\left[\left(\frac{\partial}{\partial \bar{r}} \ln p(\bar{m}|\bar{r})\right)\left(\frac{\partial}{\partial \bar{r}} \ln p(\bar{m}|\bar{r})\right)^T\right]\right\}^{-1}$$

where $$\frac{\partial}{\partial \bar{r}} \ln p(\bar{m}|\bar{r}) = \frac{\partial \bar{f}^T}{\partial \bar{r}} R^{-1}(\bar{m}-\bar{f})$$

Hence $$Q_o = \left(\frac{\partial \bar{f}^T}{\partial \bar{r}} R^{-1} \frac{\partial}{\partial \bar{r}}\right)^{-1}$$

In the TOA case $$f_i = \sqrt{(x-x_k)^2+(y-y_k)^2}$$

and a row in $\partial \bar{f}/(\partial \bar{r})$ would be $$\frac{\partial f_i}{\partial \bar{r}} = \left[\frac{(x-x_k)}{r_k} \frac{(y-y_k)}{r_k}\right]$$

where
ti $r_k = \sqrt{(x-x_k)^2+(y-y_k)^2}$.

In the TDOA case $$f_i = \sqrt{(x-x_k)^2+(y-y_k)^2} - \sqrt{(x-x_l)^2+(y-y_l)^2}$$

and a row in $\partial \bar{f}/(\partial \bar{r})$ would be $$\frac{\partial f_i}{\partial \bar{r}} = \frac{(x-x_k)}{r_k} - \frac{(x-x_l)}{r_l} \frac{(y-y_k)}{r_k} \frac{(y-y_l)}{r_l}$$

In the AOA case $$f_i = a\tan((y-y_k)/(x-x_k))$$

and a row in $\partial f/(\partial \bar{r})$ would be $$\frac{\partial f_i}{\partial \bar{r}} = \left[\frac{y-y_k}{r_k^2} \frac{x-x_k}{r_k^2}\right]$$

The Circular Error Probability (CEP) is $$P_p = P(\bar{r}^T \bar{r} < p^2)$$

which is the probability of locating the MS within a radius of p. With the assumption that the errors of the position fix are zero mean Gaussian distributed, the CEP can be written a $$P_p = 1 - \frac{2}{\pi}\int_o^{\pi/2} e \frac{p^2}{2((a\cos\theta)^2+(b\sin\theta)^2)} d\theta$$

where a and b are the diagonal elements of $Q_o$ for a rotation of the coordinate axes, so that $Q_o$ forms a diagonal matrix.

Thus it can be appreciated that the present invention will increase the accuracy in a positioning system. It will increase the "position accuracy" versus "capacity loss" because of the efficient usage of channels. It will also increase the "position accuracy versus "measurement time" because of the efficient re-subdivision.

What is claimed is:

1. A method for determining the position of a mobile station whose approximate location is known in a cellular telephone system having a plurality of base stations with known locations, which comprises:
    defining a function, which describes the cost of performing positioning measurements within the system involving system resources including a certain subset of base stations and a certain channel for positioning measurements;
    selecting a subset of base stations and a channel, which minimizes the cost of the resources within the system when performing the positioning measurements;
    assigning the mobile station to said channel;
    performing the positioning measurements relating to the position of the mobile station from said selected set of base stations having known locations on said channel; and
    obtaining a position fix estimate within a required degree of accuracy based upon said positioning measurements.

2. A method according to claim 1, wherein said function is dependent on the time when measurements are performed.

3. A method according to claims 1 or 2, wherein said function is dependent on the time period, within which measurements are performed.

4. A method according to claims 1 or 2, wherein said function is dependent on predictions of the accuracy of said position fix estimate.

5. A method according to claims 1 or 2, wherein said function is dependent on which channels are used for the said measurements.

6. A method according to claims 1 or 2, wherein said function is dependent on predictions of the accuracy of said measurements on different channels.

7. A method according to claim 6, where said predictions of measurement accuracies are dependent on the signal quality.

8. A method according to claims 1 or 2, wherein said function is dependent on the number of base stations in said subset.

9. A method according to claims 1 or 2, wherein said function is dependent on prior knowledge of the mobile position.

10. A method according to claim 9, wherein said function is dependent on an estimate of the accuracy of said mobile position.

11. A method according to claims 1 or 2, wherein said function is dependent on the load distribution in the network for a certain choice of said channel and said subset of base stations.

12. A method according to claims 1 or 2, wherein said function is dependent on the measurement methods used for said channel and said subset of base stations.

13. A method according to claims 1 or 2, wherein said function is dependent on the cost of using a high quality channel.

14. A method according to claims 1 or 2, wherein said function is dependent on the locations of said base stations.

15. A method according to claims 1 or 2, wherein said function is dependent on the estimated geometric dilution of precision.

16. A method according to claim 12, wherein one of the said measurement methods is the time of arrival measurement method.

17. A method according to claim 12, wherein one of the said measurement methods is the time difference of arrival measurement method.

18. A method according to claim 12, wherein one of the said measurement methods is the angle of arrival measurement method.

19. A method according to claims 1 or 2, wherein one base station at the time performs measurements in said subset of base stations, that is measurements are performed in a sequential order.

20. A method according to claim 19, wherein a new subset of base stations and a new channel according to said function can be selected for every step in said sequential order.

21. A method according to claim 20, wherein said mobile station is assigned to said new channel.

22. A method according to claim 20, wherein said function is dependent on previous measurements in said sequential order.

23. A method according to claim 20, wherein said function is dependent on the cost due to a change of channel assignment.

24. A method according to claim 20, wherein said function is dependent on the cost due to a change of subset of base station.

25. The method according to claim 1 wherein the step of assigning the mobile station to a channel includes assigning the mobile station to one of the base stations from the subset of base stations for the specific purpose of performing the measurement.

26. A positioning system for a cellular telephone system having a plurality of base stations with known locations and at least one mobile station whose approximate location is known, which comprises:

means for defining a function, which describes the cost of performing positioning measurements within the system involving system resources including a certain subset of base stations and a certain channel for positioning measurements;

means for selecting a subset of base stations and a channel, which minimizes the cost of the resources within the system when performing the positioning measurements;

means for assigning the mobile station to said channel;

means for performing positioning measurements relating to the position of the mobile station from said selected set of base stations having known locations on said channel; and means for obtaining a position fix estimate within a required degree of accuracy based upon said positioning measurements.

27. The system according to claim 26 wherein the means for assigning the mobile station to a channel includes assigning the mobile station to one of the base stations from the subset of base stations for the specific purpose of performing a measurement.

28. The system according to claim 27 wherein the means for obtaining a position fix estimate includes a Taylor series estimation.

29. The system according to claim 28 wherein the means for performing measurements is selected from means for performing a time of arrival measurement, means for performing a time difference of arrival measurement, or means for performing an angle of arrival measurement.

30. The system according to claim 25 wherein the means for obtaining a position fix estimate includes a Taylor series estimation.

31. The method according to claim 30 wherein the step of performing measurements is selected from performing a time of arrival measurement, performing a time difference of arrival measurement, or performing an angle of arrival measurement.

* * * * *